US006754886B1

(12) United States Patent
Merk et al.

(10) Patent No.: US 6,754,886 B1
(45) Date of Patent: Jun. 22, 2004

(54) METHOD AND SYSTEM FOR STORING JAVA OBJECTS IN DEVICES HAVING A REDUCED SUPPORT OF HIGH-LEVEL PROGRAMMING CONCEPTS

(75) Inventors: Lothar Merk, Weil i.Schoenbuch (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,283

(22) Filed: Oct. 21, 1999

(30) Foreign Application Priority Data

Nov. 30, 1998 (EP) ............................................ 98122660

(51) Int. Cl.$^7$ .................................................. G06F 9/44
(52) U.S. Cl. ........................ 717/116; 717/103; 717/175; 710/68; 710/74
(58) Field of Search ................................. 717/101–103, 717/114–123, 162–166, 174–178; 713/160; 710/65–74; 708/681–682, 684–685, 705–706

(56) References Cited

U.S. PATENT DOCUMENTS

| | | | | |
|---|---|---|---|---|
| 5,689,565 A | * | 11/1997 | Spies et al. | 713/189 |
| 5,790,677 A | * | 8/1998 | Fox et al. | 705/78 |
| 6,101,477 A | * | 8/2000 | Hohle et al. | 705/1 |
| 6,213,396 B1 | * | 4/2001 | Thoreau et al. | 235/384 |
| 6,311,165 B1 | * | 10/2001 | Coutts et al. | 705/21 |
| 6,452,616 B1 | * | 9/2002 | De Vito et al. | 345/825 |
| 6,510,516 B1 | * | 1/2003 | Benson et al. | 713/167 |

OTHER PUBLICATIONS

Paradinas et al., "New Directions for Integrated Circuit Cards Operating Systems", ACM, pp.: 56–61, Jan. 1995.*
Hamann, "Chip Cards—The Application Revolution", IEEE, pp. 15–22, 1997.*

* cited by examiner

Primary Examiner—Tuan Dam
Assistant Examiner—Ted T. Vo
(74) Attorney, Agent, or Firm—F. Chau & Associates, LLC; Casey P August

(57) ABSTRACT

The objects to be stored on a SmartCard or on a similar device are output from the host application computer in a form adapted to the device, particularly in form of a byte array which can easily be stored on such a SmartCard. That serialization comprises to convert any particular object into a sequence of bytes representing the object and its current status by storing all attributes, the name of them and all further objects which are referenced by the object which is subject to that serialization step. With the total of that information that object can be recovered in an unchanged form after any reset or interruptions which can possibly take place during usage of the SmartCard in a respective Smart-Card terminal. The recover procedure is performed in analogous form: the object as well as all further objects being referenced by that object is instantiated and is initialized with the data read out from the SmartCard. The byte array representing that object can be stored both on common file system oriented SmartCards and on JavaCards, too, without being confronted to any specific further problem.

14 Claims, 3 Drawing Sheets

Figure 1:
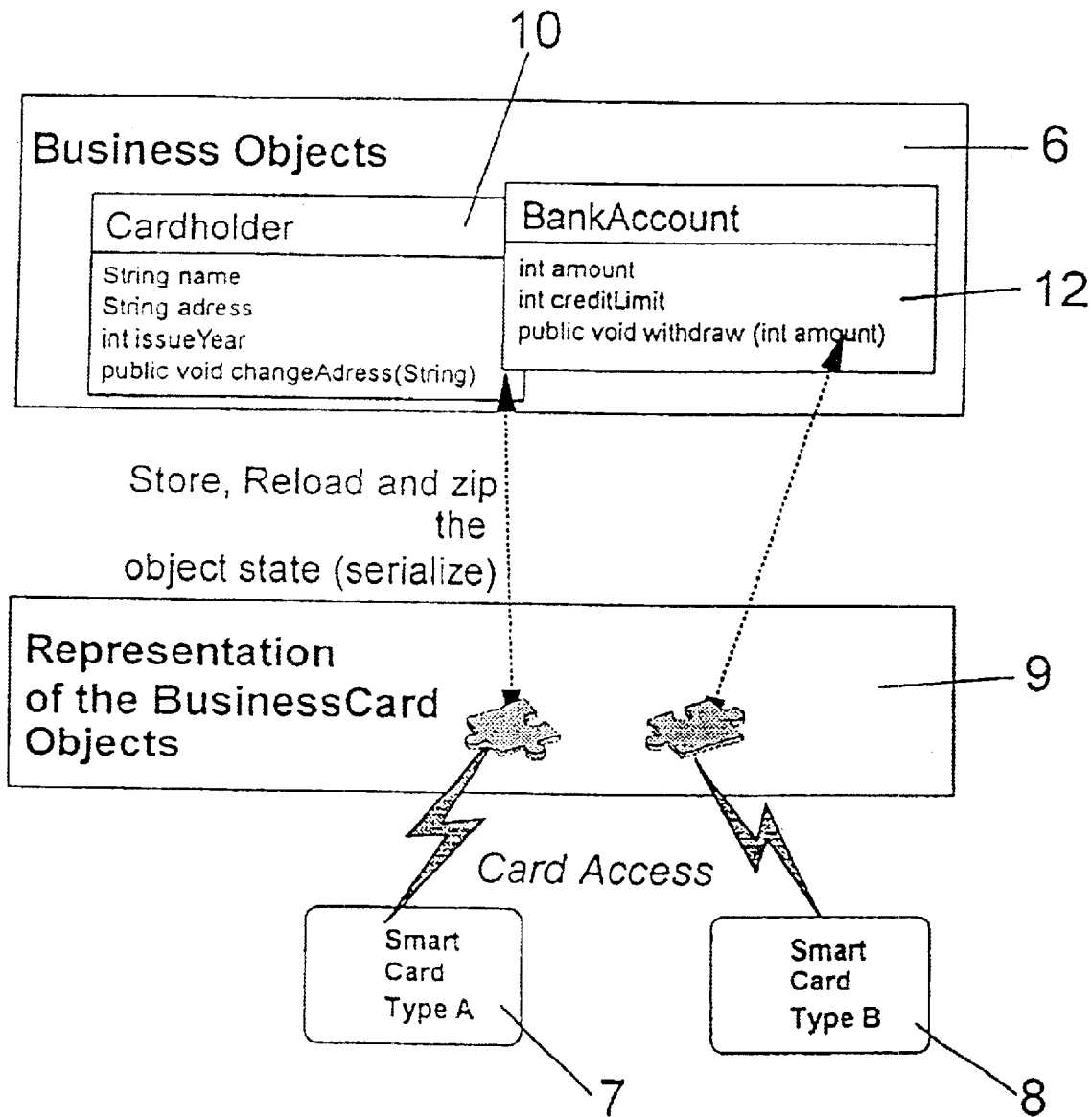

METHOD AND SYSTEM FOR STORING JAVA OBJECTS IN DEVICES HAVING A REDUCED SUPPORT OF HIGH-LEVEL PROGRAMMING CONCEPTS

1. BACKGROUND OF THE INVENTION

1.1 Field of the Invention

The present invention relates to programming and operation of applications for use with devices having a reduced support of high-level programming concepts, particularly for use with SmartCards, it relates in particular to improvements for programming read and write operations on such devices.

1.2 Description of Prior Art

Since a chip card was introduced for public telephones in France 1984, the chip card business has been rapidly growing concerning economic and technological aspects. Until the year 2000 an annual growth of 25 percent is expected. The German Geldkarte has been issued over 40 million times. Former simple storage chipboards evolved to modern SmartCards with their own microprocessor, own operation system and over 32 Kbytes free storage for applications. Very reliable authentication, electronic signature and cryptography are tasks where SmartCards are superior to traditional technologies like magnetic stripe cards. The integrated processor allows SmartCards to operate independently and not influenced by the environment: Sensible data, e.g. a secret key, never has to leave the card. Smart cards are able to execute cryptographic algorithms or check passwords locally before releasing stored data. Electronic cash transactions can be performed this way without an expensive online connection to host systems. This is why SmartCards play an important role especially in electronic business and banking.

Another important area of applications are consumer electronics: Mobiles and set-top-boxes already adopt SmartCard technology. Finally, in some years there will be a new generation of small electronic devices, i.e. reduced resources computer device which are mass produced low cost devices for a variety of daily-life purposes each holding a processing chip and some program memory.

Common to both types of devices is that they are characterized by having a reduced support of high-level programming concepts.

At least one major obstacle impedes the propagation of such devices and in particular of SmartCards and their application development: The software development problems involved with storing and reading on/from such devices.

Storing of objects, i.e. programming objects as an element of object-oriented programming (OOP) techniques is an essential subject of object-oriented software development. Storing an object comprises both, storing the attributes describing the object, and storing the status in which (OOP) methods and algorithms are when the object is stored, in order to be able to continue the methods and algorithms easily and consistently after any reset or interruption of a program having performed any operations on the objects.

Such highly developed storing methods can hardly be used, however, on reduced resources computer devices, i.e. any devices, holding a chip which is small in size and of very limited computing power and storing capacity. Further, they cannot easily be performed on above said devices having a reduced support of high-level programming concepts.

Filesystem-oriented SmartCards are an important example for such devices. On such SmartCards any information is stored by using traditional file structures.under the close memory space and file access constraints particular for such devices. Such structure contains a collection of simple file types and corresponding file directories in order to store the application data belonging to a host application the SmartCard is used with. Data are exchanged between host computer and SmartCard by using a plurality of single instruction sequences, abbreviated commonly as APDU, which carry the data as a trail behind the respective instructions and passing into and from the SmartCards mostly through a two pole contact only.

Such file system oriented SmartCards are the most commonly used ones and are the cheapest, compared to so-called JavaCards, the development of which is not yet completed. Such JavaCards are able to store complete SmartCard applications in form of Applets, and they can even perform them autonomously. In such cards said simple data types as well as complete programming objects can be stored. Such a comfortable storing procedure is, however, only possible to be realized by the SmartCard application itself and cannot be triggered by the host application for exchanging data with the respective SmartCard application. When the host application has to store any object on a JavaCard the traditional procedure of transmitting APDUs must be performed in order to exchange data.

When, however, data are transmitted in APDUs then the application developer has to take care on data formats in order to arrange all data in an adequate form on the SmartCard. This task requires a lot of specialized skill, specific for each SmartCard filesystem architecture.

In order to illustrate said data management problem the application programmer is confronted with, a small and simple example is given next below.

An application object is deemed to describe a bank account. The class name is "BankAccount". It has the attributes "Account" and "CreditLimit". Apart of that the class comprises the programming methods "Withdraw ( )", "Deposit( )" and "GetNumberOfTransactions ( )". The application developer has now to read out the particular attributes from the object and has to store them on the SmartCard specific for the respective object each, separately. Thus, Account and CreditLimit, as well as an internal counter of the GetNumberOfTransactions-method, necessary for intermediate storing of the current number of SmartCard accesses have to be treated in that complicated way.

As the application developer has to store the particular data each separately and maybe in a plurality of different ways, each way specific for a specific SmartCard type an application developer cannot take great advantage of the software development comfort which is brought with object-oriented applications, e.g. visual programming methods, as the SmartCards only support the above mentioned simple data types. The application developer has to convert objects explicitly into the simple data types supported by the SmartCard for which the application is designed. Such tasks interrupt a quick and straight forward object-oriented software development and complicates visual programming techniques.

An alternative, to take JavaCards in order to handle complex objects on SmartCards, too, is not easy to be realized as JavaCard technology is still not ready for use, expensive and not yet sufficiently standardized. Thus, the most important SmartCard sector today is that one with traditional filesystem-oriented SmartCards.

Therefore, it is an object of the present invention to improve software development for computing devices having a reduced support of high-level programming concepts and in particular for SmartCard applications by providing an object-oriented programming access to SmartCards as well.

2. SUMMARY OF THE INVENTION

This object of the invention is achieved by the features stated in enclosed independent claims. Further advantageous arrangements and embodiments of the invention are set forth in the respective subclaims.

The objects to be stored on a SmartCard or on a similar device in the above mentioned sense are output from the host application computer in a serialized form adapted to the device, particularly in form of a byte array which can easily be stored on such a SmartCard. Said serialization comprises to convert any particular object into a sequence of bytes representing the object and its current status by storing all attributes, the name of them and all further objects which are referenced by the object which is subjected to that serialization. With the total of said information said object can be principally recovered later in time or in conjunction with another host application terminal being placed at a different location including the updates which were made before. Further, the objects can be recovered in an unchanged form after any reset or interruptions which can possibly take place during usage of the SmartCard in a respective SmartCard terminal. The recover procedure is performed in analogous form: the object as well as all further objects being referenced by that object is instantiated and is initialized with the data read out from the SmartCard. The byte array representing that object can be stored both on common filesystem-oriented SmartCards and on JavaCards, too, without being confronted to any specific further problem.

The method of the present invention with the characteristics of claim 1 has the advantage, in relation to the method sketched out in the discussion of prior art technique that business objects like JavaBeans can be stored in an integral form including the attributes and the methods of an object contiguously and in one single step, instead of storing a plurality of single attributes or defining specific file formats. This simplifies application engineering extraordinarily: the application developer defines his own objects and need not take care of the binary representation thereof.

In a preferred embodiment of the inventional method applied to Java applications it is advantageous to simply realize that serialization step by taking usage of the "Object Serialization" which forms part of Java 1.1.

It is thus possible to extend the use of Java Bean items in order to apply such item technology on specific methods for handling such objects for programming purposes, like storing and reading the objects.

In a further preferred embodiment the objects are packed in TLV formatted form, i.e. Tag, Length, Value, and are compressed before being stored. This increases the usage efficiency of the limited memory space on such SmartCards and similar devices.

Thus, SmartCard application data becomes more transparent, handling of such data becomes simpler and more flexible as all data types of the applied object-oriented programming language are provided. A specific skill on SmartCard file system structures is not required for the application developer.

By providing an object-oriented application development for state of the art file system oriented SmartCards they can be used for the development of innovative software solutions which can be performed with modern object-oriented software development techniques including visual programming techniques. Thus the basic principle of the present invention closes a gap between modern programming techniques and their applicability on devices having a reduced support of high-level programming concept such as SmartCards. Closing that gap is important as new JavaCards are not yet fully developed and will be much more expensive than file system oriented SmartCards.

Thus, by aid of JavaBean technology SmartCard applications in Java can be put together out of simple and flexible software elements comprising the application data which can be stored without separate programming efforts as a whole unit on any SmartCard.

Such elements provide for assembling complex structures of SmartCard information by visual programming techniques without any specific skill on SmartCards and without a longer skill on the subject. Taking the proposed Java Serialization in order to perform the proposed conversion offers the advantage of a well accepted quasi-standard concerning the storing format of the object states.

Further, requirements for larger memory space compared to the requirements of conventional, optimized card layout can be equilibrated and balanced due to the above mentioned advantages and due to the clearly recognizable trend towards SmartCards with steadily increasing memory space.

Furthermore, the proposed method requires no JavaSmartCard technology but can, however include JavaSmartCards for usage.

Furthermore, a persistent storage of object status can be achieved and be used for elegantly using complex own classes of an object-oriented application in conjunction with SmartCards.

Finally, this approach is predestined for visual software engineering in which the programmer generates his application objects and connects them by events quasi-intuitively in a graphical environment.

3. BRIEF DESCRIPTION OF THE DRAWINGS

Figure 2:
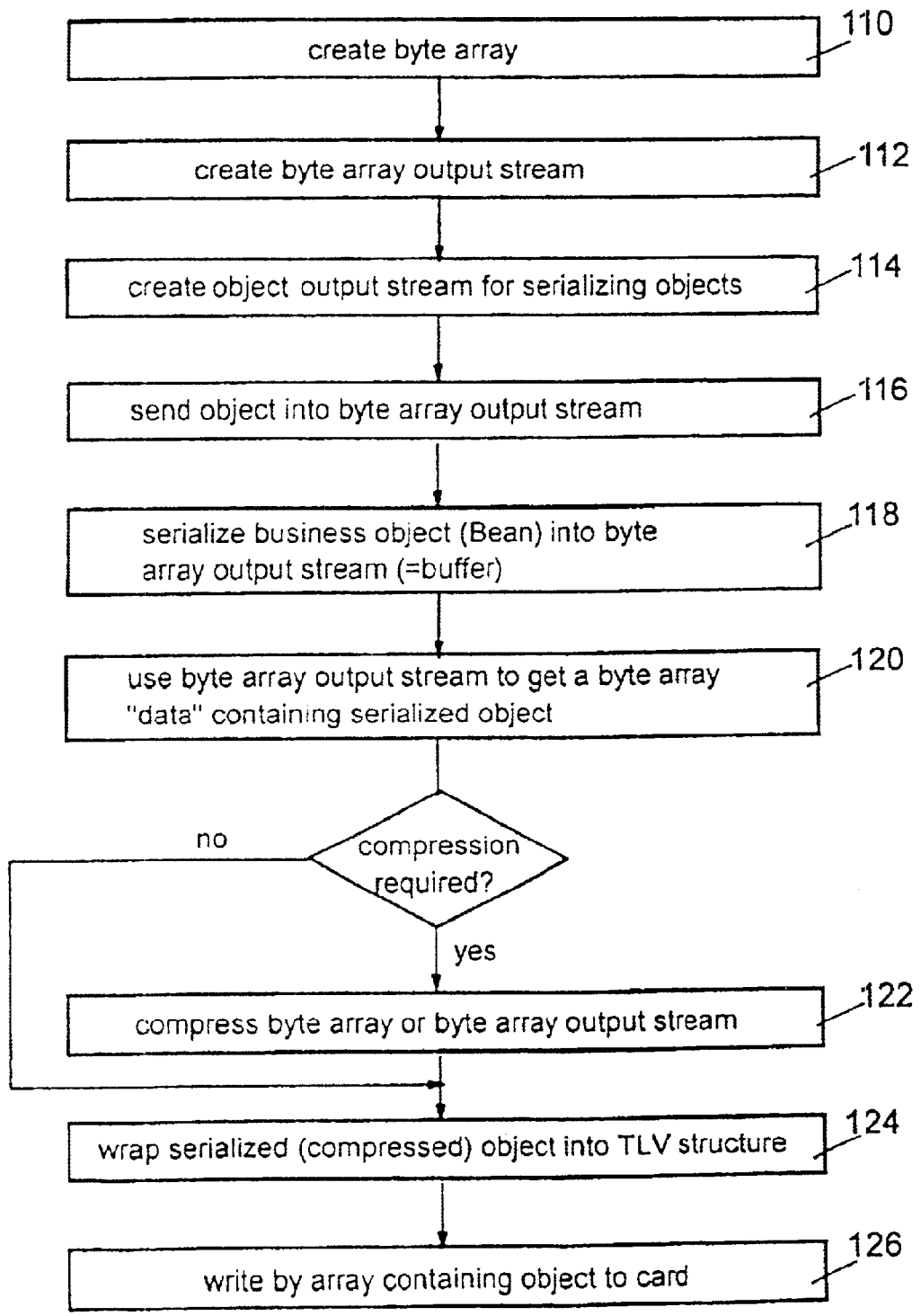
Figure 3:
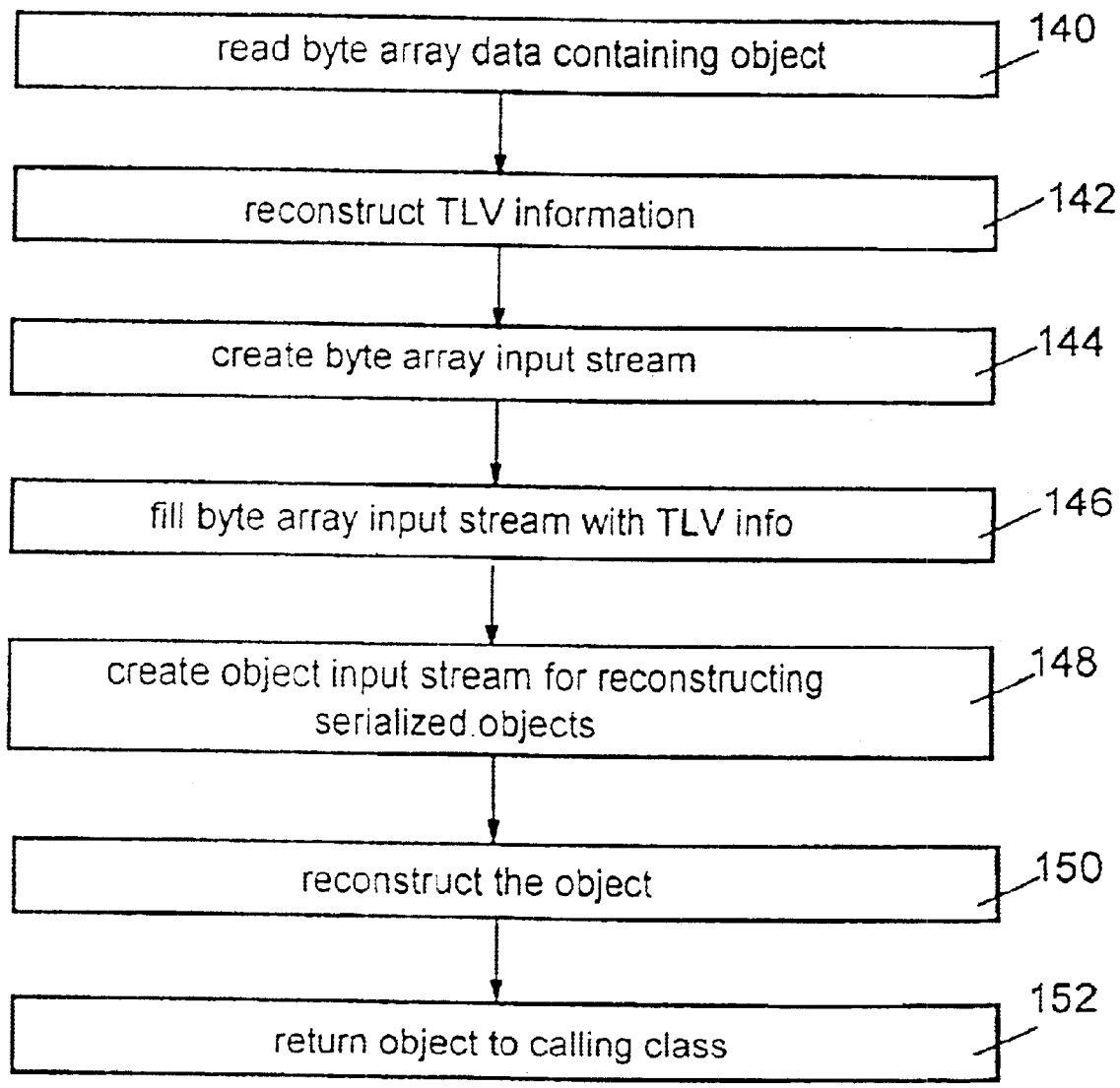

The present invention is illustrated by way of example and is not limited by the shape of the Figures of the accompanying drawings in which:

FIG. 1 is a schematic sketch giving a summarizing overview on the inventional storing and reading methods including the objects and the representation of their status, FIG. 2 is a schematic representation of a block diagram showing the essential steps of the storing method according to the invention, FIG. 3 is a schematic representation of a block diagram showing the essential steps of the reading method according to the invention.

4. DESCRIPTION OF THE PREFERRED EMBODIMENT

With general reference to the Figures and with special reference now to FIG. 1 the basic principle of the present invention is illustrated and summarized next below.

Said principle is illustrated by way of a banking application 6 which is deemed to work with a plurality of different SmartCards 7, 8 over a programming interface 9 which plays a central role in implementing the inventional method. Said application comprises at least two exemplary application objects, one object 10 holding data describing the cardholder, and a further object 12 describing the cardholder's bank account. This example is held simple intentionally in order to focus on the kernel of the present invention.

The serialization of objects before storing them and the respective deserialization after reading them is taking place in said interface 9 and can be comprised by a JavaBean-ItemClass which is provided to the application engineer.

Said BeanItemClass provides functionality to store and to recover, i.e. to read application specific objects onto and from the SmartCards, respectively. But any particular application object can be defined by the application engineer himself. The account object 12 could be outlined as follows:

```
{
    public BankAccount( )
    {
    }
    int account;
    int creditLimit;
    private numberofTransactions=0;
    public void Withdraw(Integer amount) {
        account = account-amount;
        numberofTransactions++;
    }
    public void Deposit(Integer amount) {
        account = account+amount;
        numberOfTransactions++;
    }
    public int getNumberOfTransactions( ) {
        return numberOfTransactions;
    }
}
```

As can be seen it possesses three data items, i.e account, credit limit and number of transactions, and three methods working on said items, i.e. for withdrawing money, for depositing money and for reading out the number of transactions which is increased on each withdrawal or deposit.

According to the invention there is no need to make any assignment between any data and the location on the Smart-Card where they will be stored or, from where they would be recovered, respectively. The application engineer need not identify the particular attributes and need not use specific methods to realize the SmartCard file access. The status of the object "BankAccount" can be stored in an integral form onto the SmartCard by way of the BeanItem-method "saveToCard ( )" which is described in more detail down below.

That serialization is general and valid for all objects and can be readily applied from BeanItem for any other Smart-Cards.

Next, and with additional reference to FIG. 2 the basic steps in order to store an object 'o' on a SmartCard by aid of a BeanItem object are described additionally by an excerpt of the following commented, programmer's code which can be seen as a part of the host application 6 source code:

```
/**************************************************
* Export the Bean to the SmartCard
**************************************************/
public void saveToCard(Object o) throws IOException {
    // create a byte array -step 110 and a
    //ByteArrayOutputStream -step 112 to hold temporary data
    byte[ ] data;
    ByteArrayOutputStream buffer=new ByteArrayOutputStream( );
    // create an object output stream which can serialize
    // objects -step 114 and send them into a
    //ByteArrayOutputStream -step 116
    ObjectOutputStream out=new ObjectOutputStream(buffer);
    // Serialize the Business Object (Bean) into the
    // ByteArrayOutputStream called "buffer"- step 118
    // using the Java serialization algorithm
    // (provided by the Java-ObjectOutputStream-Class).
    Out.writeObject(o);
    // Alternatively an individual serialization algorithm
    // could be called instead
    // Use the ByteArrayOutputStream to get a byte array
    // "data" containing the serialized object -step 120
    data = buffer.toByteArray( );
    // If required the byte array or the
    // ByteArrayOutputStream which contains the serialized
    // object can be compressed using the Java zip-mechanism
    // or other sophisticated algorithms -step 122
    // wrap the serialized and compressed object into a TLV
    // structure (e.g. Using the OpenCard Framework API)
    // as recover information defining the bit length of the      //
    object - step 124.
    TLV dataTLV = new TLV ( TAG__OCAF__CLASS__NAME , data) ;
    // write the byte array "data" which contains the
    // serialized object to card - step 126.
    // (e.g. Using OpenCardFramework, PCSC etc.)
    CardFile.setData(dataTLV.toBinary( ));
    // Close the Streams
    out.close( );
}
```

Correspondingly, the recovering step of the object 'o' is independent of the object itself, which is illustrated by the following commented programmers code which should be read with reference to FIG. 3.

```
/**************************************************
* Get the Bean from the smartcard
**************************************************/
public Object loadFromCard( ) throws IOException {
    // read the byte array "data" which contains the
    // serialized object from card -step 140.
    // (e.g. Using OpenCardFramework, PCSC etc.)
    byte[ ] data = cardFile.getData( );
    // Since the serialized object is wrapped into a TLV
    // structure, reconstruct the TLV (e.g. Using the OpenCard
    // Framework API) - step 142
    TLV dataTLV = new TLV (data);
    // create a ByteArrayInputStream -step 144 to hold //temporary
data
    // and fill it with the value of the reconstructed TLV
    //-step 146
    ByteArrayInputStream buffer=
        new ByteArrayInputStream(dataTLV.valueAsByteArray( ));
    // create an object input stream which can reconstruct
    // serialized objects from a ByteArrayInputStream -step 148
    ObjectInputStream in=new ObjectInputStream(buffer);
    // read (reconstruct) the object
    try {
        Object o= in.readObject( );
        In.close( );
        // Return the reconstucted Object to the calling class
        // step 152
        return o;
        // Do some exception handling
    } catch (Exception cnfe) {
    }
}
```

Now, after storing and subsequent recovering the same object status is recovered exactly except the status of the internal number of transaction counter which was increased from seven to eight by a respective counter.

As can be seen from above reading and storing objects can be programmed without any specific SmartCard filesystem knowledge if the application engineer is provided with the respective JAVA BeanItem objects loadFromCard ( ) and saveToCard ( ), respectively.

In conjunction with the co-pending application concerning visual programming of SmartCard applications by using card independent objects the storing and recovering of objects of Java applications can be realized even card-independently using a visual engineering environment: There, a Java interface is provided defining methods for storing and recovering of objects. The application can use such methods as a placeholder, i.e. a dummy in order to define its own SmartCard access procedures, which in turn can be advantageously performed by visual programming techniques, as well. Using the principle presented in that co-pending application the actual implementation of the interface is performed at application runtime and specific for each of the applied SmartCards. Thus, the proper implementation is instantiated depending of the actual used SmartCard in order to serialize the concerned object and to store it onto the SmartCard or to recover it therefrom.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

| | |
|---|---|
| 6 | host application |
| 7, 8 | SmartCards |
| 9 | interface |
| 10, 12 | objects |
| 110–156 | steps comprised of the inventional method |

What is claimed is:

1. A method for storing objects in devices having a reduced resources of high-level programming support, in which said objects are associated with both an application implemented on such device and a host application running on a host computer, the method comprising a step of:

providing an interface between the host application and the device application, said interface being associated with said objects and comprising methods being able to be performed on the attributes associated with said objects, the method being characterized by the step of:

serializing, contiguously, attributes and methods of said objects into a format applicable to said devices.

2. The method according to claim 1, in which said reduced resources computer devices are SmartCards.

3. The method according to claim 1, wherein serializing is performed with Java Class technology by providing a serializing BeanItem.

4. The method according to claim 1, in which said objects are packed in tag, length, value formatted form and/or compressed prior to storing said objects.

5. A method for recovering objects from devices having reduced resources for high-level programming support in which said objects are associated with both an application implemented on such device and a host application running on a host computer, the method comprising a step of:

providing an interface between said host application and said device application, said interface being associated with said objects and comprising methods being able to be performed on the attributes associated with said objects the method being characterized by the step of de-serializing contiguous attributes.and methods of said objects from a format applicable on said devices.

6. The method according to claim 5, in which said devices are SmartCards.

7. The method according to claim 5, wherein de-serializing is performed with Java Class technology by providing a de-serializing BeanItem.

8. The method according to claim 5, further comprising the step of reading said objects onto or from said device, wherein said objects are uncompressed and/or unpacked from tag, length, value formatted form after reading said objects.

9. A program storage device readable by machine, tangibly embodying a program of instructions executable by the machine to perform method steps for storing objects in devices having a reduced resources of high-level programming support, in which said objects are associated with both an application implemented on such device and a host application running on a host computer, the method steps comprising:

providing an interface between the host application and the device application, said interface being associated with said objects and comprising methods being able to be performed on the attributes associated with said objects, the method being characterized by the steps of serializing, contiguously, attributes and methods of said objects into a format applicable to said devices; and de-serializing contiguous attributes and methods of said objects from a format applicable on said devices.

10. The method according to claim 9, in which said reduced resources computer devices are SmartCards.

11. The method according to claim 9, wherein serializing is performed with Java Class technology by providing a serializing BeanItem.

12. The method according to claim 9, in which said objects are packed in tag, length, value formatted form and/or compressed prior to storing said objects.

13. The method according to claim 9, wherein de-serializing is performed with Java Class technology by providing a de-serializing BeanItem.

14. The method according to claim 9, further comprising the step of reading said objects onto or from said device, wherein said objects are uncompressed and/or unpacked from tag, length, value formatted form after reading said objects.

* * * * *